United States Patent [19]
Bliven

[11] Patent Number: 5,473,613
[45] Date of Patent: Dec. 5, 1995

[54] DIGITAL ADDED MAIN LINE SYSTEM

[75] Inventor: David C. Bliven, San Jose, Calif.

[73] Assignee: Raychem Corporation, Menlo Park, Calif.

[21] Appl. No.: 382,094

[22] Filed: Jan. 27, 1995

Related U.S. Application Data

[63] Continuation of Ser. No. 385,610, Jul. 25, 1989.

[51] Int. Cl.⁶ .............................. H04J 3/00; H04M 1/00; H04Q 5/00; H04L 25/34
[52] U.S. Cl. .................. 370/112; 370/118; 375/240; 375/286; 379/93; 379/399; 379/402; 455/343; 341/126
[58] Field of Search .................... 370/37, 77, 84, 370/110.1, 112, 118; 375/240, 286, 288, 289; 379/90, 93, 94, 106, 156, 167, 176, 387, 399, 402; 455/38.3, 343; 341/126, 144

[56] References Cited

U.S. PATENT DOCUMENTS

| | | | |
|---|---|---|---|
| 3,308,240 | 3/1967 | Von Sanden | 179/15 |
| 3,510,584 | 5/1970 | Krasin et al. | 179/2.5 |
| 3,660,606 | 5/1972 | De Witt | 179/15 BA |
| 3,711,650 | 1/1973 | Kuhn et al. | 179/15 BW |
| 3,824,597 | 7/1974 | Berg | 343/204 |
| 3,851,106 | 11/1974 | Jacobaeus | 179/15 AP |
| 3,922,493 | 11/1975 | Brenig et al. | 179/15 AP |
| 4,001,514 | 1/1977 | Wurst | 179/18 FC |
| 4,100,377 | 7/1978 | Flanagan | 179/15 AS |
| 4,112,427 | 9/1978 | Hofer et al. | 340/347 |
| 4,145,574 | 3/1979 | Wintzer | 179/15 A |
| 4,351,049 | 9/1982 | Nobis | 370/62 |
| 4,381,427 | 4/1983 | Cheal et al. | 179/2 DP |
| 4,389,284 | 8/1983 | Canniff | 370/56 |
| 4,417,333 | 11/1983 | Cochennec | 370/66 |
| 4,519,073 | 5/1985 | Bertocci et al. | 370/118 |
| 4,577,315 | 3/1986 | Otsuka | 370/95 |
| 4,644,527 | 2/1987 | Anderson et al. | 370/58 |
| 4,689,789 | 8/1987 | Herger | 370/110.1 |
| 4,698,801 | 10/1987 | Hatano et al. | 370/58 |
| 4,712,210 | 12/1987 | Davis et al. | 370/77 |
| 4,740,963 | 4/1988 | Eckley | 370/110.1 |
| 4,751,696 | 6/1988 | Black | 370/58 |
| 4,755,994 | 7/1988 | Staples et al. | 370/118 |
| 4,771,418 | 9/1988 | Narasimhan et al. | 370/58 |
| 4,788,680 | 11/1988 | Kikuchi et al. | 370/68 |
| 4,924,292 | 5/1990 | Gitlin et al. | 379/9.3 |
| 5,111,497 | 5/1992 | Bliven | 379/27 |
| 5,198,818 | 3/1993 | Samueli et al. | 341/144 |
| 5,255,317 | 10/1993 | Arai et al. | 379/399 |

FOREIGN PATENT DOCUMENTS

| | | | |
|---|---|---|---|
| 0173984 | 3/1986 | European Pat. Off. | H04Q 11/04 |
| 0260470 | 3/1988 | European Pat. Off. | H04L 27/00 |
| 0370423 | 5/1990 | European Pat. Off. | H04M 3/30 |
| 59-070395 | 4/1984 | Japan | H04Q 11/04 |
| 59-211366 | 11/1984 | Japan | H04M 3/50 |
| 61-045699 | 3/1986 | Japan | H04Q 3/60 |
| 62-159561 | 7/1987 | Japan | H04M 1/00 |

OTHER PUBLICATIONS

Kaiser et al., "Digital Two–Wire Local Connection Providing Office Subscribers With Speech, Data and New Teleinformation Services," ISSLS, Mar. 20–24, 1978.

Kawakami et al., "Improved Subscriber Loop Multiplexing Systems Systems for Rural Areas," *Japan Telecommunications Review*, Apr. 1978, pp. 125–132.

Siemens, "Telecommunications Data Book 1987".

(List continued on next page.)

*Primary Examiner*—Hassan Kizou
*Attorney, Agent, or Firm*—Townsend and Townsen and Crew

[57] ABSTRACT

A method and apparatus for transmitting and receiving multiple telephone transmission signals over a single twisted pair. An analog signal from a local switching station is converted to an 80 kbits/sec signal for transmission over a twisted pair. A remote terminal converts the 80 kbits/sec signal back into a conventional analog signal for use in conventional telephone, facsimile or other related equipment.

11 Claims, 7 Drawing Sheets

OTHER PUBLICATIONS

Results of a computer database search.

Bellamy, *Digital Telephony,* Chapters 1 and 2, John Wiley & Sons, 1982.

Optilink Corporation, "Pairspan–2 Digital Subscriber Carrier System Product Line Description" (Jul. 20, 1989).

Optilink Corporation, "Pairspan–2 Two–Line Digital Carrier System" (1989).

Pacific Bell Request For Quote, Jun. 14, 1989.

Bell Atlantic Network Services, Inc. RFQ#90BGP0018.

Letter from David Bliven to Nynex Material Enterprises, Jan. 23, 1989 (with Request For Quote).

"Digital Added Main Line System," *ECF Forum 88.*

Advertising materials for "DuaLine System" (1990) Rockwell International.

Advertising materials for "DigiLoop" (Undated) ECI Telecom.

Advertising materials for "DAML–100" (Undated) Wheelock, Inc.

Advertising materials for "Pairgain2 Digital Pair Saver" (Undated) PairGain Technologies, Inc.

Siemens, *ISDN Communication Controller (ICC) PEB 2070 Data Sheet, Rev. 3.0* (Jul. 1988).

Siemens, *Dual Channel Codec Filter SICOFI®2 PEB 2260 Data Sheet, Rev. 1.0* (Jan. 1989).

ANSI, *Integrated Services Digital Network (ISDN) Basic Access Interface for Use on Metallic Loops for Application on the Network Side of the NT* (1988).

Pacific Bell PUB L–780057–PB/NB, Issue 1, May 1989.

Klodt, "Two terminals for DMS–1," *Telesis,* Aug. 1977, pp. 107–111.

Fukuda et al., "An Approach to LSI Implementation of a 2B1Q Coded Echo Canceler for ISDN Subscriber Loop Transmission," Bostonicc/89, Session 8, Paper 2, vol. 1, Jun. 11, 1989, Boston, Mass., pp. 233–238.

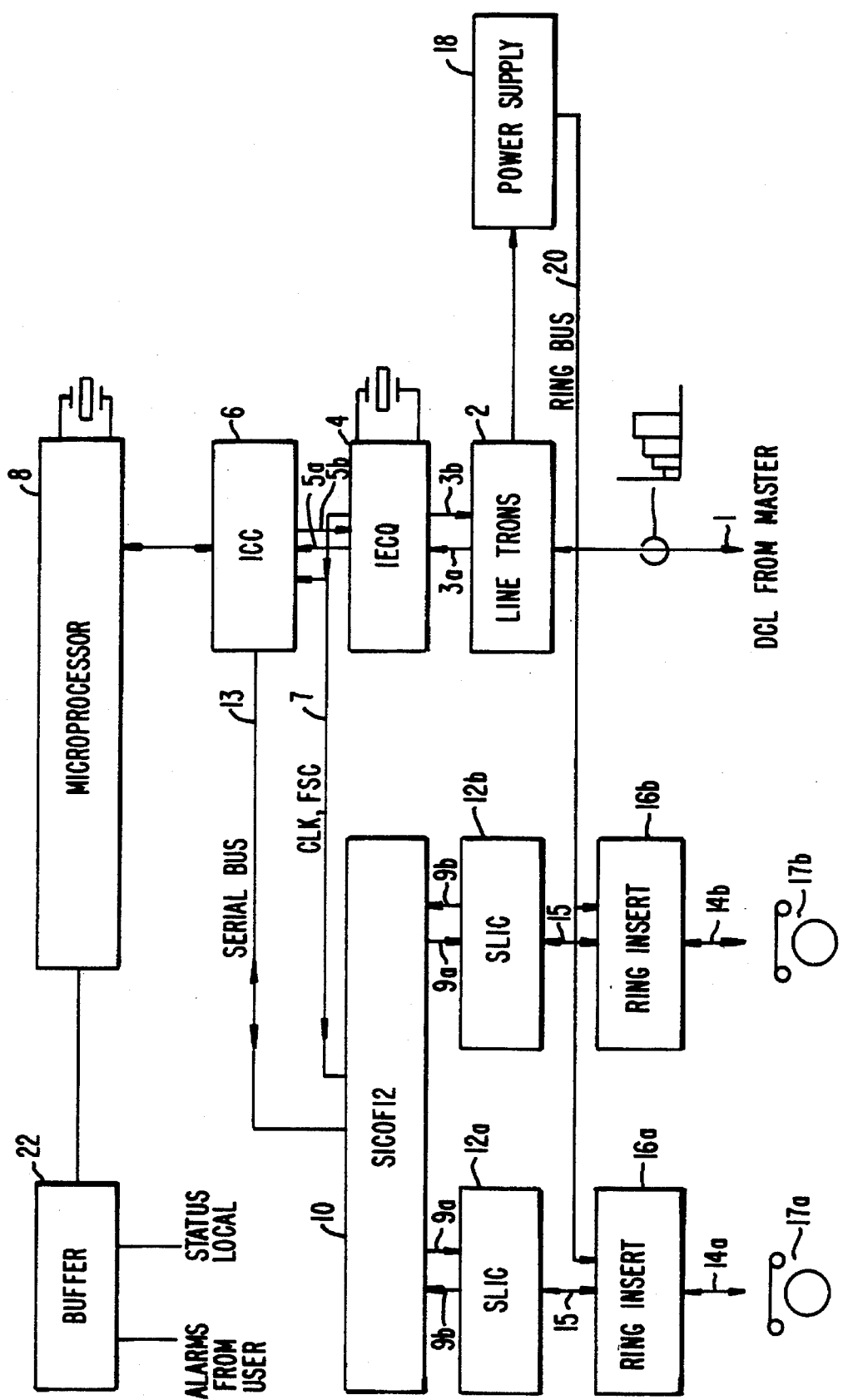
FIG._1.

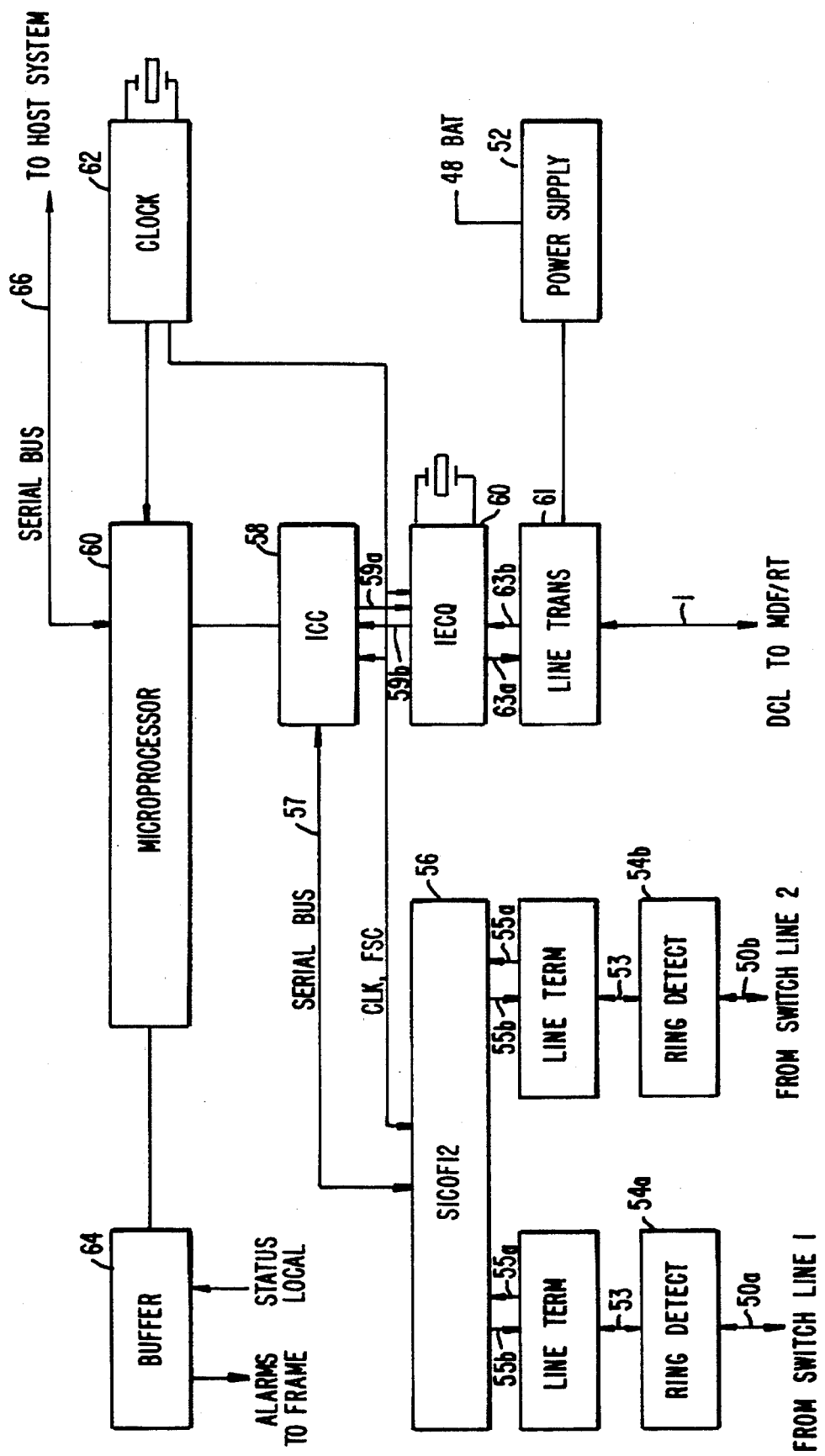
FIG._2.

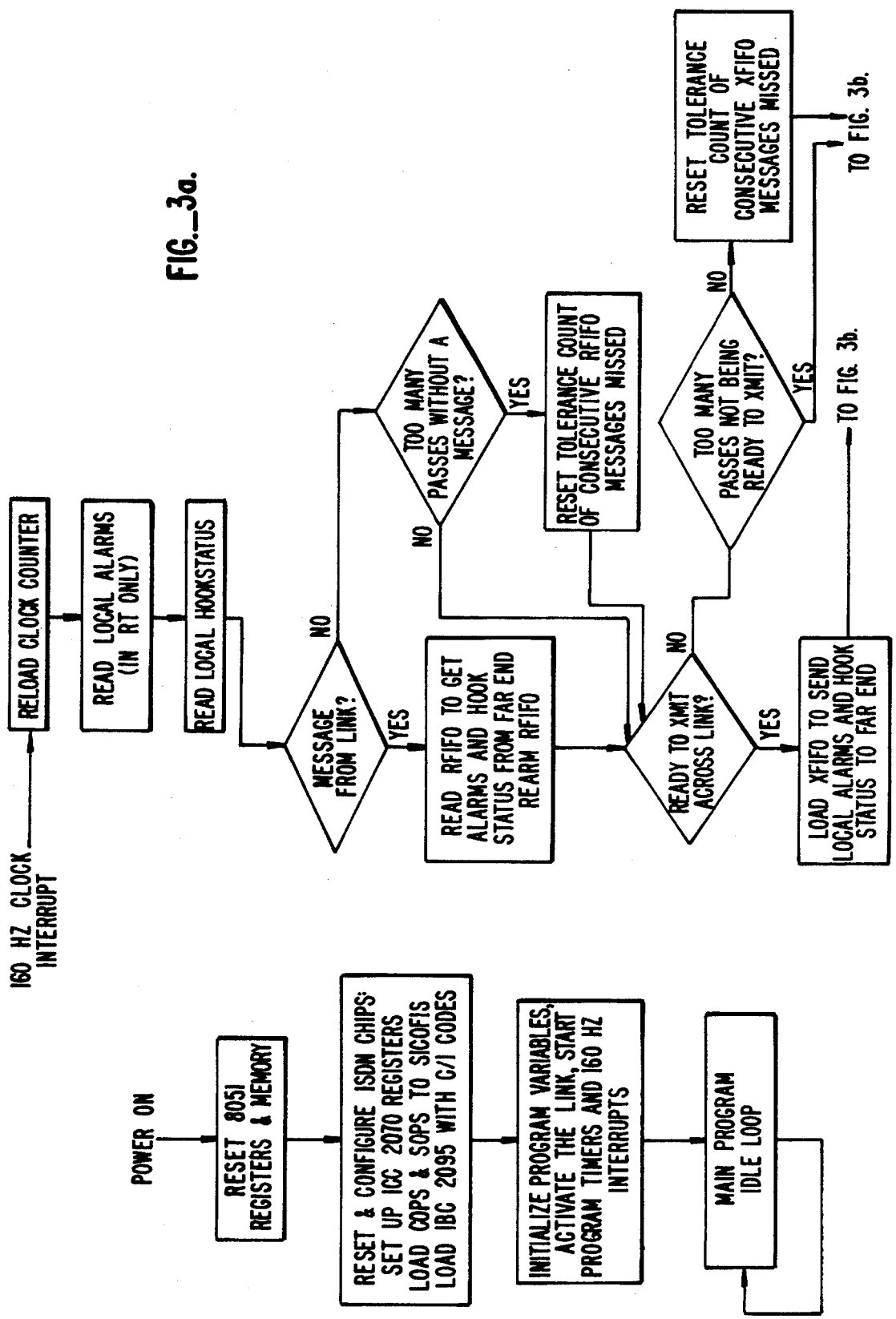
FIG._3a.

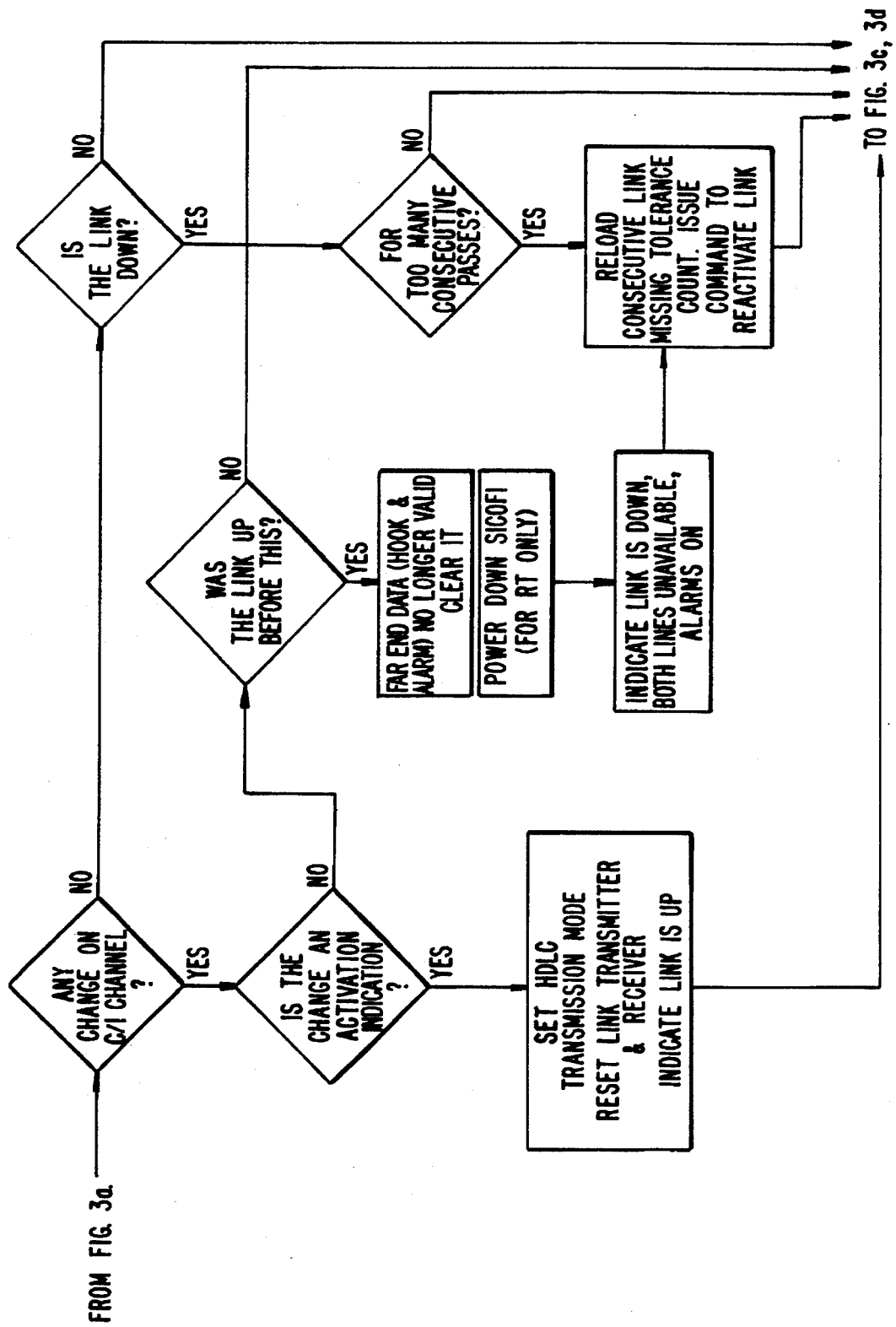
FIG._3b.

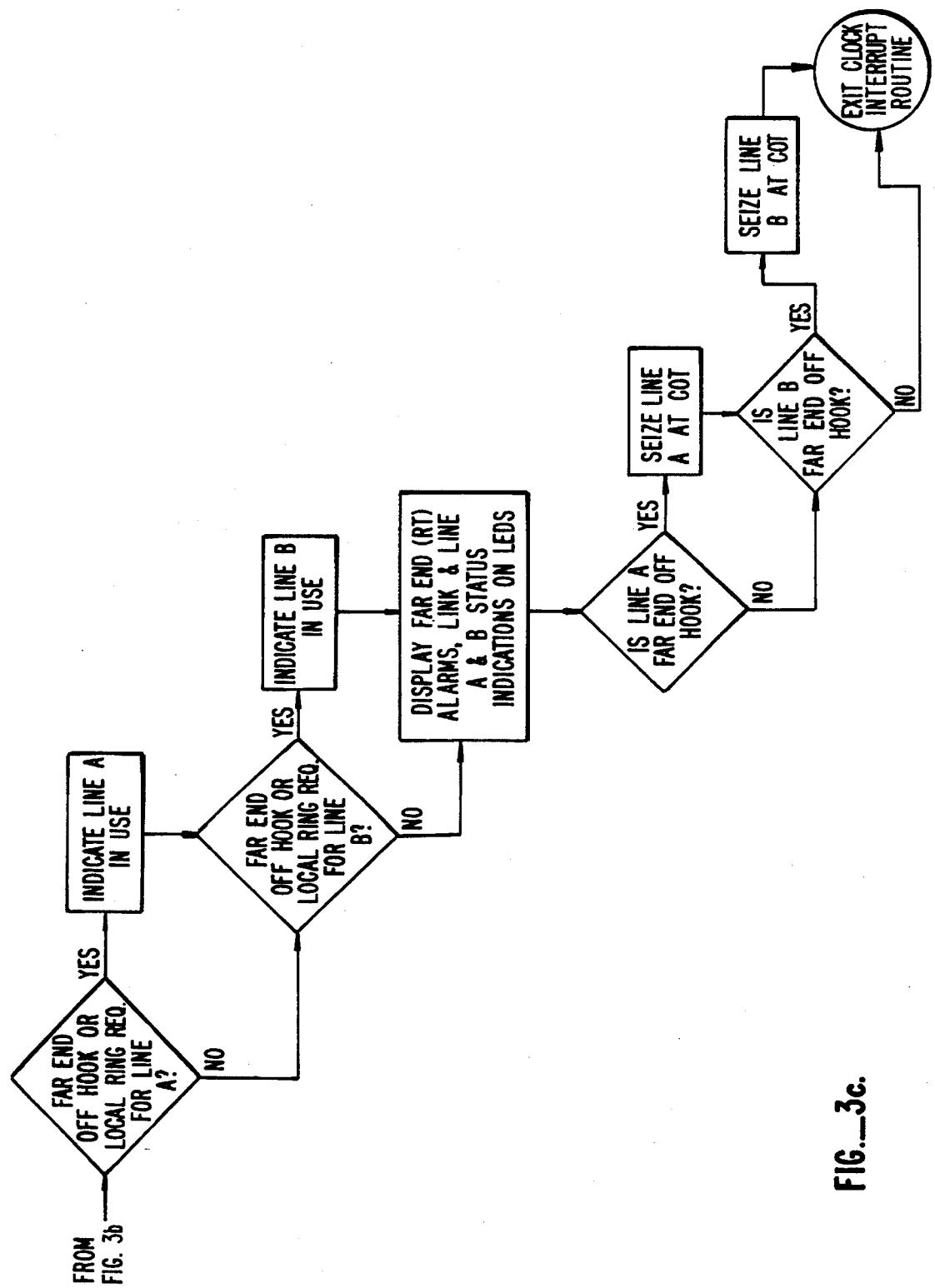
FIG._3c.

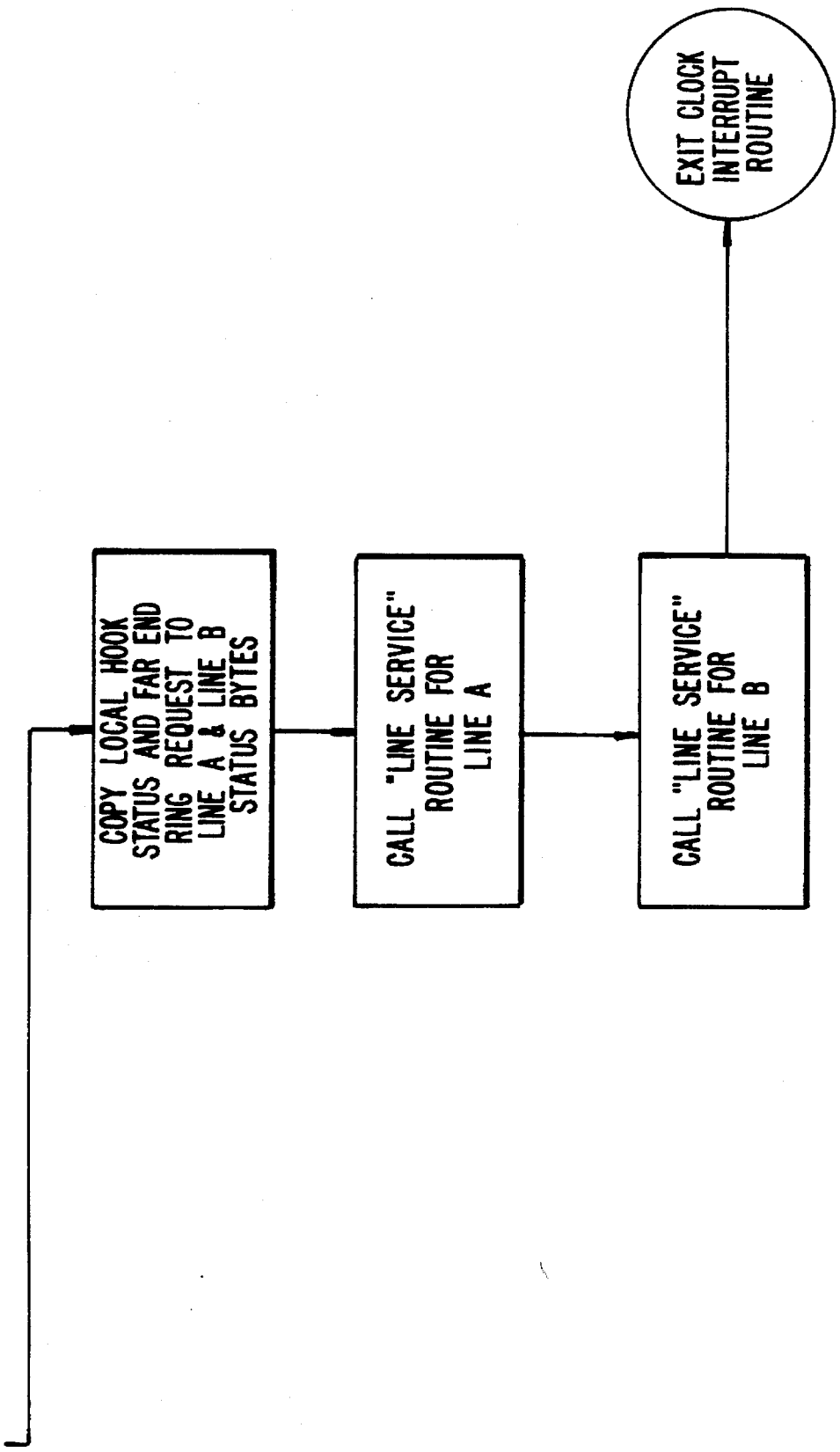
FIG._3d.

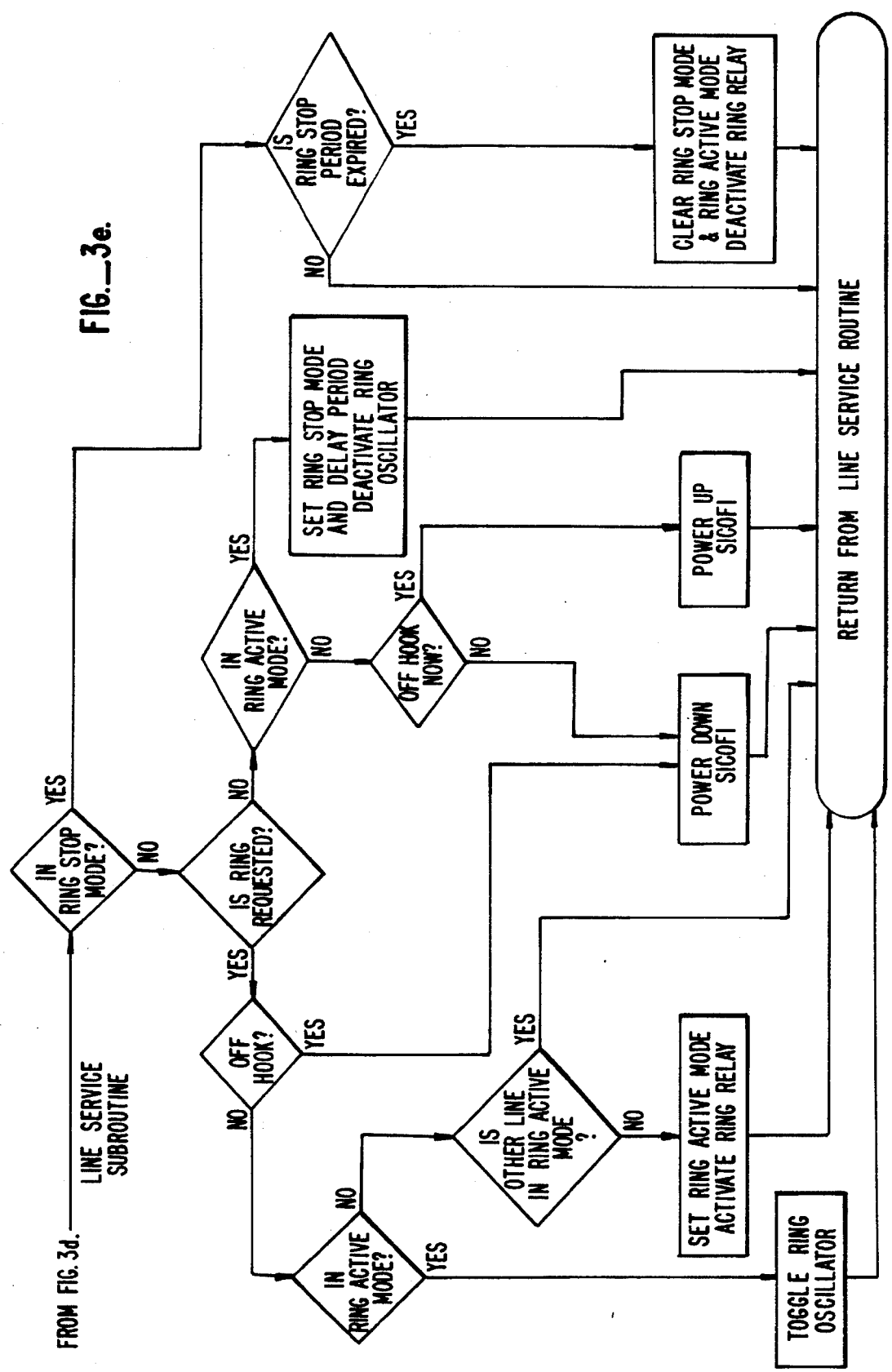

DIGITAL ADDED MAIN LINE SYSTEM

CROSS-REFERENCE TO RELATED APPLICATIONS

This is a Rule 60 Continuation of U.S. application Ser. No. 07/385,610, filed Jul. 25, 1989.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to the field of telephone communication. More particularly, in one embodiment the present invention provides a method and apparatus for simultaneously transmitting information from multiple phone connections over a single twisted pair line.

Techniques for transmission of multiple voice or data signals over a single phone line are well known in the telecommunications industry and are commonly referred to as concentration techniques. In the past, frequency division multiplexing was the most commonly used technique for simultaneous transmission of multiple voice or data signals over a single line. Frequency multiplexing techniques are still commonly used in, for example, wideband transmission media.

Digital time division multiplexing techniques have been used since the 1960's and have become the most common concentration technique in, for example, inter-office circuits. An entire family of T-carrier (Trunk carrier) systems such as T1, T1C, T1D, T2, and T4, have been developed for concentration of multiple voice and data signals over a common line. Digital concentration techniques are described in, for example, Bellamy, *Digital Telephony*, Wiley and Sons, 1982, which is incorporated herein by reference for all purposes.

Digital communication has become relatively standard in, for example, intraoffice trunks. One example of a method for transmitting multiple voice or data signals over a single two- or four-wire transmission line is disclosed in Kaiser et al., "Digital Two Wire Local Connection Providing Office Subscribers With Speech, Data, and New Teleinformation Services," ISSLS, Mar. 20–24 (1978). In Kaiser et al., telephone data, view data, telecopier information and the like are transmitted in a digital fashion over a two- or four-wire line to a local exchange. Digital data are transmitted in data bursts which are later expanded and recovered using, e.g., time division multiplexing techniques.

Despite advances in the multiplexing techniques a variety of problems remain. For example, some multiplexing techniques continue to require complex and, therefore, uneconomical equipment. This equipment is particularly unsuitable for individual or small office users. Further, when applied to residential users, small office users, and the like, some systems require that the user provide a power source such as a transformer connection to a 120 v. power source, a battery power source or the like. Some systems require that the user replace existing two-wire connections with less conventional connections and/or are limited in the distance of twisted pair line over which information may be transmitted. In spite of certain advances in the ability to transmit multiple voice and data signals over single twisted pairs, most local switching units continue to provide a single analog signal over a single twisted pair to a typical home or office.

It would be desirable to provide an improved and more economical method and associated apparatus for multiplexing multiple phone line connections over a single twisted pair connection especially for use in providing multiple phone lines over a single twisted pair into a home or office from a local telephone exchange.

SUMMARY OF THE INVENTION

An improved method and apparatus for transmission of multiple signals over a single twisted pair is disclosed. In a preferred embodiment the invention provides for transmission of multiple voice and/or data signals over a single twisted pair from a local telephone exchange to a subscriber.

In one embodiment, the invention provides apparatus for concurrently receiving "n" telephone signals over a twisted pair, where "n" is greater than 1, comprising at a first location, means for receiving a digital signal from a local telephone exchange, the digital signal representing said "n" telephone signals in digital form; means for converting the digital signal into a first higher-rate binary signal; and means for converting the higher-rate binary signal into "n" analog signals for use in equipment at said first location. The digital signal may, for example, be a 4B3T or quaternary signal.

A method of transmitting "n" telephone signals over a twisted pair from a first location is also provided. The method includes the steps of converting "n" analog telephone signals to a binary signal; converting the binary signal to a lower-rate digital signal; and transmitting said lower-rate digital signal over said twisted pair to a second location. In an alternative embodiment, the method includes the steps of inputting a digital signal from a second location over a twisted pair to a first location; converting the digital signal to a higher-rate binary signal and converting the higher-rate binary signal to "n" analog signals for use in telephone equipment at the first location.

A kit for concurrent transmission of a plurality of telephone signals over a single twisted pair from a subscriber location to a local switching station is also provided. The kit includes master equipment including a means for conversion of quaternary 80 kbits/sec signals to and from a higher-rate binary data stream; a SICOFI for conversion of the binary data stream from and to analog signals; and remote terminal equipment including a means for conversion of quaternary 80 ksymbol/sec signals from and to binary higher-rate data streams; a means for conversion of binary higher-rate data streams from and to analog signals and a means for two-wire to four-wire conversion.

BRIEF DESCRIPTION OF THE FIGURES

FIG. 1 is an overall block diagram of a remote terminal (RT) according to one embodiment of the invention;

FIG. 2 is an overall block diagram of a master according to one embodiment of the invention; and FIGS. 3a to 3e are block diagrams of the logic used in microprocessor in the RT.

DETAILED DESCRIPTION OF THE PREFERRED EMBODIMENTS

CONTENTS

I. General
II. Digital Data Transmission
  A. Hardware
  B. Software/Microprocessor Functionality
III. Power Management

I. General

An improved method and apparatus for transmitting and receiving data over a single twisted pair wire are disclosed herein. The method and apparatus will find particular utility and is illustrated herein as it is applied in the transmission of multiple voice, data, and alarm signals over existing twisted pair lines which are used to connect homes, offices, and the like to local switching facilities, or central offices, but the invention is not so limited. The invention will find use in a wide variety of applications where it is desired to transmit multiple voice and/or data signals over a single twisted pair including, for example, facsimile, computer data, alarms, and/or low-speed video signals.

II. Digital Data Transmission

A. Hardware

FIG. 1 provides a block diagram of a remote terminal (RT) according to one embodiment of the invention. The RT would be placed in, for example, a home, office or other subscriber facility for transmission and/or reception of voice or data signals over a single twisted pair line 1 to and from a local telephone exchange. A plurality of phones or other subscriber equipment would utilize analog signals produced by the RT and provide analog signals to the RT for transmission over the twisted pair.

A signal DCL From Master enters or leaves the RT over the conventional two-wire line 1, which may be the type commonly used in households, offices, or the like. As will be readily apparent to those of skill in the art, the signal could either be a transmitted voice or data signal from the master. The invention will be illustrated herein as it applies to the RT primarily with regard to an incoming signal, but the process is similarly applied in reverse to provide voice and data signals from the RT to the master.

The signal DCL From Master, representing in digital form a voice or data signal, enters a line transformer 2 for isolation and for impedance matching. The voice or data signal entering the line transformer 2 is an 80 kbits/sec signal having one of four voltage levels. While the invention is illustrated herein with regard to the preferred 80 ksymbol/sec signal, it is believed that the invention herein would find utility using signals of between about 50 and 100, and preferably between 70 and 90 ksymbol/sec. The use of an 80 kbits/sec 2B1Q ANSI line protocol signal permits the transmission and reception of voice and data signals over extended lengths of twisted pair wires, e.g., 1,000, 15,000, 20,000 feet or more, without smearing, i.e., signal quality over large distances is improved because the lower frequency 80 ksymbol signal may be more readily separated.

The signal from the line transformer enters an ISDN Echo Cancellation-Quaternary (IECQ) chip 4 via line 3a. The 80 ksymbol 2B1Q INSA line protocol signal contains 160 kbits/sec of information and the IECQ chip 4 converts the 80 ksymbol/sec signal into a 160 kbits/sec binary signal. The 160 kbits includes 16 kbits of line control information and 144 kbits of user data. 112 kbits/sec of chip control information are added to the data stream by the IECQ chip, resulting in 256 kbits/sec data stream from the IECQ chip and provided to ISDN Communications Controller (ICC) multiplexing and data handling chip 6 over line 5a. The ICC operates on a clock signal (CLK) at, for example, about 520 kHz and a frame control signal (FSC) at, for example, about 8 kHz. CLK and FSC are provided over line 7.

Over a one-wire bus 13, the ICC chip 6 sends 8 bits of data on one channel, 8 bits of data on the other channel, 8 bits of control, and 8 bits of signal data to Codac Filter (SICOFI) 10, and then repeats, permitting substantially simultaneous transmission/reception of two or more voice or data signals. Monitor data, ring data, and other data which the microprocessor poles are also made available to the microprocessor.

SICOFI 10 converts the binary bits into analog signals in which both frequency and amplitude are modulated. The analog signals are then transmitted over line 9a to Subscriber Line Interface Circuits (SLIC's) 12a and 12b. SLIC's 12a and 12b are 4-wire to 2-wire converters and serve to increase the power available for utilization by the subscriber's phone or other communication device by enpressing the analog signal on high velocity DC. Conventional analog information is provided to subscriber phones 17a and 17b from the SLIC's over lines 14a and 14b.

Ring inserts 16a and 16b are relays which close when it is desired for a phone to ring under the direction of the microprocessor. Power supply 18, using a process more fully described below, provides general power and ring power to the phones at appropriate times via a ring bus 20. Buffer 22 serves to interface local status and alarms.

Outgoing signals from the subscriber are processed in a similar but reverse method from incoming signals. In particular, analog signals enter SLIC's 12a and 12b for two-wire to four-wire conversion via lines 15. Signals from SLIC's 12a and 12b enter SICOFI 10 via lines 9b for analog-to-binary 8-bit word conversion. These 8-bit words are, thereafter, converted in ICC 6 into a binary stream containing 160 kbits/sec of user information (144 kbits of user data plus 16 kbits of line control) for input to IECQ 4 via line 5b. IECQ 4 converts the 160 kbits/sec signal to an 80 ksymbol/sec quaternary signal for transmission to telephone company equipment over the twisted pair 1.

FIG. 2 is a block diagram of a master unit which would be placed in a local switching unit, central office, or other telephone company equipment at the terminus of a twisted pair wire 1 from a home, office or the like. The function of the master is similar to that of the RT, but reversed; i.e., the master converts conventional analog signals from local switch lines 50a and 50b to appropriate digital signals for transmission over the twisted pair and converts digital signals from the twisted pair to analog for transmission over local switch lines. Of course, the master is not generally power constrained (due to its location and lack of need to provide ring capability) and may function using a conventional 48-volt power supply 52 from the local switching unit.

Ring detects 54a and 54b detect an incoming ring signal from switch lines 50a and 50b by AC coupling. When a ring is detected the microprocessor sends an appropriate ring signal in the line control data so as to ring a line at the RT.

Incoming analog signals enter SICOFI 56 from the switch lines via lines 55a where they are converted to digital, 8-bit words similar to those in the RT described above. SICOFI 56 transmits to the ICC via bus 57. ICC 58 serves a multiplexing and data handling function similar to that of the ICC in the RT and transmits 160 kbits/sec of user information (144 kbits of user data plus 16 kbits of line control) to IECQ 60 via line 59a for conversion to 80 kbits/sec quaternary signals for transmission over twisted pair 1. The master similarly processes incoming digital information from the RT in a reverse order. Line transformer 61 also serves an isolation function, receiving signals via line 63a.

The functionality of the master is overseen by a microprocessor 60, similar to the RT. A clock 62 provides timing information for the microprocessor and the other components in master and, ultimately, the RT. Buffer 64 serves to interface status and alarms. Bus 66 serves to provide an office system interface from system alarms.

Without in any way limiting the scope of the invention, Tables 1 and 2 provide a list of commercially available components which are useful in operation of the RT and Master respectively according to the above embodiments. It will be apparent to those of skill in the art that the components listed in Tables 1 and 2 are merely representative of those which may be used in association with the inventions herein and are provided for the purpose of facilitating assembly of a device in accord with the invention. A wide variety of components readily known to those of skill in the art could readily be substituted or functionality could be combined or separated. It should be noted that CMOS-based devices have been utilized where possible (e.g., the microprocessor) so as to reduce power consumption of the RT in particular.

TABLE 1

RT Components

| Line Transformer 2 | 13 mh, 1:1.32 |
|---|---|
| IECQ 4 | Siemens 2091 |
| ICC 6 | Siemens 2070 |
| Microprocessor 8 | Intel 80C49, 80C51 or 87C51 |
| SICOFI 10 | Siemens 2260, or 2060 |
| SLIC 12 | Erickson PBL 3764, or Harris equipment |
| Buffer 22 | 74HC244 |

TABLE 2

Master Components

| Ring Detect 54 | Siemens PSB 6620 |
|---|---|
| SICOFI 56 | Siemens 2260 or 2060 |
| ICC 58 | Siemens 2070 |
| IECQ 60 | Siemens 2091 |
| Clock 62 | 74HC4060 |
| Microprocessor 60 | Intel 80C51, 87C51 or 8048 |

B. Software/Microprocessor Functionality

Appendix I provides an assembly language program listing (Copyright, Unpublished Work, Raychem Corporation) for the RT microprocessor 8 discussed above. The code is adapted for and has been used on an Intel 80C51 microprocessor, although it will be apparent that the invention could be applied to a wide variety of such processors. Appendix II (Copyright, Unpublished Work, Raychem Corporation) provides a similar listing for the code used in the microprocessor 60 in the master. This code has been used in the Intel 80C51. Again, however, a wide variety of microprocessors could be used herein without departing from the scope of the invention.

FIGS. 3a to 3e are flow charts illustrating the functionality of the software used in the RT and Master, and provide an overview of the software in Appendix 1 and Appendix 2. The left hand portion of FIG. 4a illustrates the power-up sequence used to initiate the system. The system begins by resetting the microprocessor (8051) registers and memory. The ISDN chip 2, the ICC, SICOFI's, and the like are reset and configured. Variables within the program are, thereafter, activated, timers are started, and 160 Hz interrupts are started. The program then enters a main loop, which is illustrated in detail beginning on the right half of FIG. 4a.

Upon receiving a 160 Hz clock interrupt, the system reloads the clock counter and, in the RT, reads any local alarms (such as alarms from a burglar alarm and the like). The system then reads the local hook status and determines if a message has been transmitted over the link from the RT/Master. If a message has been transmitted over the link, the system reads the message to determine the hook status (i.e., on or off hook) and any alarms. If there is not a message from the other end of the link, the system determines if it has made more than a preset number of passes without a message from the other end of the link. If so, the tolerance count of consecutive messages missed is reset and an alarm is set which may be, for example, passed off to a CO.

In any event, the system then goes on to determine if it is ready to transmit across the link by checking a flag in the ICC. If not, a similar test and reset procedure is followed to that described above for receiving messages. If the link is ready to transmit, the messages are loaded and sent to the RT/Master from the Master/RT.

Referring to FIG. 3b, the system then determines if there has been any change in the command/instruction (C/I) channel from the SICOFI. If not, the system determines if the link is down and, if not, continues on. If the link is down, the system compares the number of passes to a limit and, if the link has been down for greater than that limit, resets a link missing tolerance count and issues a command to reactivate the link.

If there has been a change on the C/I channel, the system then determines if the change has been an activation indication. If not, the system determines if the link was previously up and, if not, the loop continues. If the link was previously up, the SICOFI in the RT is powered down, and the hook and alarm data for the far end are reset. An indication is also provided to the user that both lines are down and the alarms are on. The missing tolerance count is reset and a command is then issued to reactivate the link.

Referring to FIG. 3c, if the change on a C/I channel was an activation indication, the High-Level Data Logic Control (HDLC) transmission mode is set, the link transmitter and receiver are reset, and an indication is provided that the link is up. The system then continues through the main loop.

In the master (or "COT" end) the main loop then determines if the off hook or local line request for line A is received. If so, an indication is provided at the Master that line A is off the hook. A similar test is provided for line B and displays are provided on LED's. The system then determines, for both lines, if the line is off the hook. For either line which is off the hook, a line is seized at the COT. The clock interrupt routine is then exited at the Master.

Referring to FIG. 3d, the main loop in the RT continues by copying the local hook status and far-end ring request to line status bytes. Line service routines for both lines are called and the clock interrupt routine is exited.

FIG. 3e illustrates the line service routine for the RT. A test is first conducted to determine if the RT is in a ring stop mode. If so, a test is conducted to determine if a ring stop period has expired and, if so, the ring stop mode is cleared and the ring relay is deactivated. The system then returns to the main loop.

If the system is not in a ring stop mode, it is determined if a ring is requested. If a ring is requested, but the line is off the hook, the SICOFI is powered down to conserve power, and the line service routine is exited. If the line is not off the hook, it is determined if the line is in the ring-active mode and, if so, a ring oscillator is toggled and the line service routine returns to the main loop. An intermediate test is conducted, however, to determine if the other line is off the hook. If not, the ring relay is activated. However, if the other ring is in the ring-active mode, the system returns to the main loop.

If a ring has not been requested, the line is not in the ring-active mode, and the line is not off the hook, the SICOFI is powered down and the system returns to the main loop. If, however, the line is off the hook, the SICOFI is powered up for conversation. If a ring has not been requested and the line is in the ring-active mode, the ring stop mode is set and the ring oscillator is deactivated. The system then returns to the main loop.

III. Power Management

The system described above provides multiple-line telephone services to a user over a single twisted pair without the need to provide a battery or other current source at the RT. At the same time, the system maintains the line power within the limits proscribed by TR-TSY-000057 standard AII in a standby mode and AIII during active line use.

Table 3 illustrates the power usage of the various components in the system in a standby mode, an active mode, a 1-ring mode, and a 1-active, 1-ring mode. The data illustrated in Table 3 are based on a 16500-foot twisted pair using 26-gauge wire plus 1500 feet of 24-gauge wire.

Table 3 illustrates that by use of the method/apparatus disclosed herein, in the standby mode the system is well within AII limits. Specifically, about 430 milliwatts may readily be provided in a typical system while remaining in AII limits, while only 373 milliwatts are needed during standby. Similarly, the 2302 milliwatts needed for 1-ring and 1-active signals are well within the amount of power which may be provided while staying within AIII limits.

TABLE 3

| | System Power Use (milliwatts) | | | |
|---|---|---|---|---|
| | Mode | | | |
| Component | Standby | 2-Active | 1-Ring | 1-Active, 1-Ring |
| Microprocessor | 25 | 25 | 25 | 25 |
| ICC | 3 | 3 | 3 | 3 |
| IECQ | 300 | 300 | 300 | 300 |
| SICOFI | 3 | 120 | 120 | 120 |
| SLIC | 42 | 90 | 42 | 66 |
| Loop | 0 | 1176 | 0 | 588 |
| Ring | 0 | 0 | 1200 | 1200 |
| TOTAL: | 373 | 1714 | 1690 | 2302 |

It is to be understood that the above description is intended to be illustrative and not restrictive. Many embodiments will be apparent to those of skill in the art upon reviewing the above description. By way of example the inventions herein have been illustrated primarily with regard to transmission of voice and data signals (POTS), but they are not so limited. For example, the inventions could be applied in the transmission and reception of radio and TV signals, telephoto, teletype, facsimile, and other signals. By way of further example, the inventions have been illustrated above with reference to the simultaneous transmission of two signals over a single twisted pair, but the inventions could readily be extended to transmit 3 or more signals simultaneously over a single twisted pair. The scope of the inventions should, therefore, be determined not with reference to the above description, but should instead be determined with reference to the appended claims, along with the full scope of equivalents to which such claims are entitled.

What is claimed is:

1. Apparatus for concurrent transmission and reception of multiple telephone signals between a telephone company location and a subscriber location over a single twisted pair, said apparatus comprising:

a) at a telephone company location, master equipment comprising:

i) master conversion means coupled to telephone company equipment, for converting a plurality of incoming telephone company analog signals from said telephone company equipment into an outgoing telephone company higher-rate multiplexed binary signal, and for converting an incoming telephone company higher-rate multiplexed binary signal into a plurality of outgoing telephone company analog signals for use in said telephone company equipment; and ii) master line-coding means coupled to said master conversion means and to said signal twisted pair, for converting said outgoing telephone company higher-rate multiplexed binary signal into an outgoing line-coded digital signal and transmitting said outgoing line-coded digital signal over said single twisted pair to a subscriber location, and for receiving an incoming line-coded digital signal from said subscriber location and converting said incoming line-coded digital signal into said incoming telephone company higher-rate multiplexed binary signal; and b) at said subscriber location, a remote terminal comprising:

i) remote line-coding means coupled to said single twisted pair, for receiving said outgoing line-coded digital signal and converting said outgoing line-coded digital signal into an outgoing subscriber higher-rate multiplexed binary signal, and for converting an incoming subscriber higher-rate multiplexed binary signal into said incoming line-coded digital signal and transmitting said incoming line-coded digital signal over said single twisted pair;

ii) remote conversion means coupled to said remote line-coding means and to subscriber equipment, for converting said outgoing subscriber higher-rate multiplexed binary signal into a plurality of outgoing subscriber analog signals for use in said subscriber equipment, and for converting a plurality of incoming subscriber analog signals from said subscriber equipment into said incoming subscriber higher-rate multiplexed binary signal; and wherein each of said plurality of incoming telephone company analog signals, each of said plurality of outgoing telephone company analog signals, each of said plurality of outgoing subscriber analog signals, and each of said plurality of incoming subscriber analog signals is a full-duplex two-wire analog signal; and wherein said incoming line-coded digital signal and said outgoing line-coded digital signal are signals selected from the group of 2B1Q and 4B3T signals.

2. The apparatus as recited in claim 1, wherein said single twisted pair has a length greater than 1,000 feet.

3. The apparatus as recited in claim 1, wherein said single twisted pair has a length greater than 15,000 feet.

4. The apparatus as recited in claim 1, wherein said outgoing telephone company higher-rate multiplexed binary signal, said incoming telephone company higher-rate multiplexed binary signal, said outgoing subscriber higher-rate multiplexed binary signal, and said incoming subscriber higher-rate multiplexed binary signal are substantially 160 kbits/second signals.

5. The apparatus as recited in claim 1, wherein said outgoing line-coded digital signal and said incoming line-coded digital signal are substantially 80 ksymbols/second signals.

6. The apparatus as recited in claim 1, wherein a portion of said remote terminal is powered down if a line is not in an active state.

7. A method for concurrently transmitting and receiving multiple telephone signals between a telephone company location and a subscriber location over a single twisted pair, said method comprising:

at a telephone company location:
inputting a plurality of incoming telephone company analog signals from telephone company equipment to master equipment and outputting a plurality of outgoing telephone company analog signals from said master equipment to said telephone company equipment;
converting said plurality of incoming telephone company analog signals to an outgoing telephone company higher-rate multiplexed binary signal and converting an incoming telephone company higher-rate multiplexed binary signal to said plurality of outgoing telephone company analog signals;
converting said outgoing telephone company higher-rate multiplexed binary signal to an outgoing line-coded digital signal and converting an incoming line-coded digital signal to said incoming telephone company higher-rate multiplexed binary signal; and
transmitting said outgoing line-coded digital signal over said single twisted pair to said subscriber location and receiving said incoming line-coded digital signal at said master equipment; and at a subscriber location:
receiving said outgoing line-coded digital signal from said single twisted pair at a remote terminal and transmitting said incoming line-coded digital signal over said single twisted pair to said master equipment;
converting said outgoing line-coded digital signal to an outgoing subscriber higher-rate multiplexed binary signal and converting an incoming subscriber higher-rate multiplexed binary signal to said incoming line-coded digital signal;
converting said outgoing subscriber higher-rate multiplexed binary signal to a plurality of outgoing subscriber analog signals and converting a plurality of incoming subscriber analog signals to said incoming subscriber higher-rate multiplexed binary signal; and
outputting said plurality of outgoing subscriber analog signals to subscriber equipment and inputting said plurality of incoming subscriber analog signals from said subscriber equipment to said remote terminal; and wherein each of said plurality of incoming telephone company analog signals, each of said plurality of outgoing telephone company analog signals, each of said plurality of outgoing subscriber analog signals, and each of said plurality of incoming subscriber analog signals is a full-duplex two-wire analog signal; and wherein said incoming line-coded digital signal and said outgoing line-coded digital signal are signals selected from the group of 2B1Q and 4B3T signals.

8. The method as recited in claim 7, wherein said single twisted pair has a length greater than 1,000 feet.

9. The method as recited in claim 7, wherein said single twisted pair has a length greater than 15,000 feet.

10. The method as recited in claim 7, wherein said outgoing telephone company higher-rate multiplexed binary signal, said incoming telephone company higher-rate multiplexed binary signal, said outgoing subscriber higher-rate multiplexed binary signal, and said incoming subscriber higher-rate multiplexed binary signal are substantially 160 kbits/second signals.

11. The method as recited in claim 7, wherein said outgoing line-coded digital signal and said incoming line-coded digital signal are substantially 80 ksymbols/second signals.

* * * * *

REEXAMINATION CERTIFICATE (4141st)

United States Patent [19]
Bliven

[11] B1 5,473,613
[45] Certificate Issued *Aug. 29, 2000

[54] DIGITAL ADDED MAIN LINE SYSTEM

[75] Inventor: David C. Bliven, San Jose, Calif.

[73] Assignee: Raychem Corporation, Menlo Park, Calif.

Reexamination Request:
No. 90/005,185, Dec. 14, 1998

Reexamination Certificate for:
Patent No.: 5,473,613
Issued: Dec. 5, 1995
Appl. No.: 08/382,094
Filed: Jan. 27, 1995

[ * ] Notice: This patent is subject to a terminal disclaimer.

Related U.S. Application Data

[63] Continuation of application No. 07/385,610, Jul. 25, 1989.

[51] Int. Cl.[7] ..................................................... H04J 3/00
[52] U.S. Cl. ......................... 370/535; 370/468; 375/240; 375/286; 379/399; 379/402; 379/93.08; 455/343; 341/126
[58] Field of Search ................................... 370/276, 498, 370/232, 468, 477, 522, 535, 539; 375/240, 286, 288, 289; 379/90.01, 93.08, 106.01, 156, 167, 176, 387, 399, 402; 455/343; 341/126, 144

[56] References Cited

U.S. PATENT DOCUMENTS

| | | | |
|---|---|---|---|
| 4,893,310 | 1/1990 | Robertson et al. | 370/270 |
| 5,459,730 | 10/1995 | Bliven | 370/465 |
| 5,640,196 | 6/1997 | Behrens et al. | 348/14 |

FOREIGN PATENT DOCUMENTS

0251986  1/1988  European Pat. Off. ......... H04Q 5/02

OTHER PUBLICATIONS

ISDN Basic Access Digital Subscriber Lines, TA–TSY–00393, published Mar. 1987.
Universal Digital Channel Requirements and Objectives, TA–TSY–000398, published Sep. 1986.
"Making the Transition: Fiber Winds Its Way Home", Hewitt and Pitchford, Telephony, p. 34, published Feb. 15, 1988.
2B1Q, U–Interface Line Code Tutorial, MITEL Semiconductor Product News, published Feb. 5, 1987.
MITEL 2B1Q Line Code Tutorial, Application Note for ST–Bus Family MSAN–127, published Jan., 1987.
CCIT Blue Book, vol. 111, Digital Networks, Digital Sections and Digital Line Systems, Recommendations G.801–G.961, published 1988.
British Telecommunications Headquarters Specification RC 7328, Draft 2, published May, 1989.
Requirements and Objectives for DAML, Pacific Bell/Nevada Bell Technical Reference, PUB L–780057–PB/NB, Issue 1, published May, 1989.

*Primary Examiner*—Douglas W. Olms

[57] ABSTRACT

A method and apparatus for transmitting and receiving multiple telephone transmission signals over a single twisted pair. An analog signal from a local switching station is converted to an 80 kbits/sec signal for transmission over a twisted pair. A remote terminal converts the 80 kbits/sec signal back into a conventional analog signal for use in conventional telephone, facsimile or other related equipment.

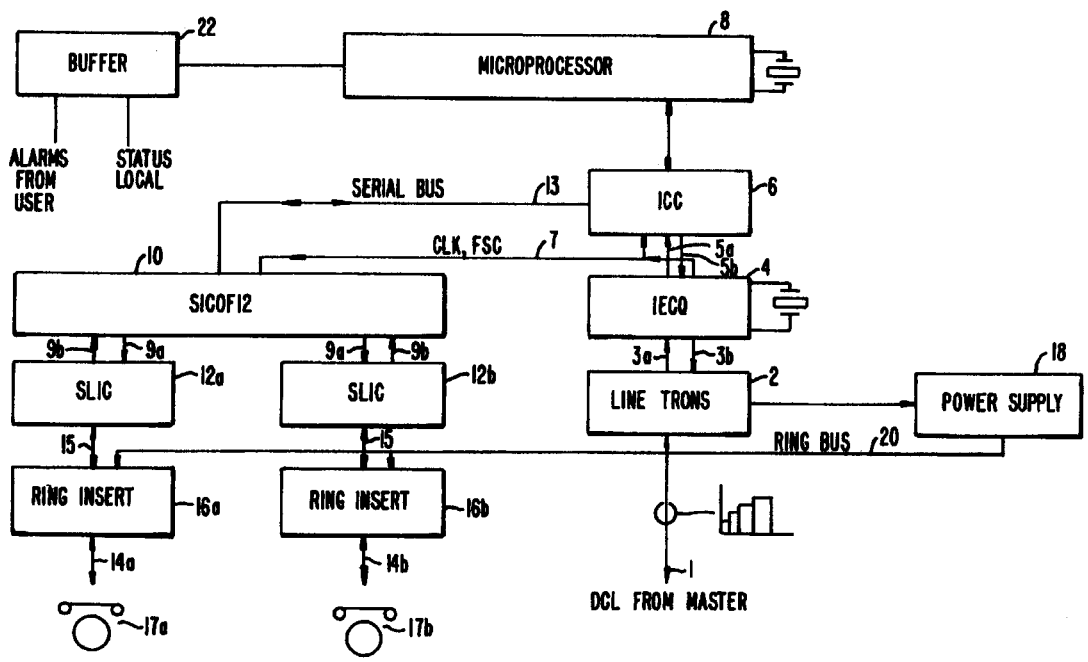

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7–11 is confirmed.

Claims 1 and 5 are determined to be patentable as amended.

Claims 2–4 and 6, dependent on an amended claim, are determined to be patentable.

New claims 12 and 13 are added and determined to be patentable.

1. [Apparatus] *An apparatus* for concurrent transmission and reception of multiple telephone signals between a telephone company location and a subscriber location over a single twisted pair, said apparatus comprising:
   a) at [a] *said* telephone company location, master equipment comprising:
      i) master conversion means coupled to telephone company equipment, for converting a plurality of incoming telephone company analog signals from said telephone company equipment into an outgoing telephone company higher-rate multiplexed binary signal, and for converting an incoming telephone company higher-rate multiplexed binary signal into a plurality of outgoing telephone company analog signals for use in said telephone company equipment; and
      ii) master line-coding means coupled to said master conversion means and to said signal twisted pair, for converting said outgoing telephone company higher-rate multiplexed binary signal into an outgoing line-coded digital signal and transmitting said outgoing line-coded digital signal over said single twisted pair to [a] *said* subscriber location, and for receiving an incoming line-coded digital signal from said subscriber location and converting said incoming line-coded digital signal into said incoming telephone company higher-rate multiplexed binary signal; and
   b) at said subscriber location, a remote terminal comprising:
      i) remote line-coding means coupled to said single twisted pair, for receiving said outgoing line-coded digital signal and converting said outgoing line-coded digital signal into an outgoing subscriber higher-rate multiplexed binary signal, and for converting an incoming subscriber higher-rate multiplexed binary signal into said incoming line-coded digital signal and transmitting said incoming line-coded digital signal over said single twisted pair;
      ii) remote conversion means coupled to said remote line-coding means and to subscriber equipment, for converting said outgoing subscriber higher-rate multiplexed binary signal into a plurality of outgoing subscriber analog signals for use in said subscriber equipment, and for converting a plurality of incoming subscriber analog signals from said subscriber equipment into said incoming subscriber higher-rate multiplexed binary signal; and
   wherein each of said plurality of incoming telephone company analog signals, each of said plurality of outgoing telephone company analog signals, each of said plurality of outgoing subscriber analog signals, and each of said plurality of incoming subscriber analog signals is a full-duplex two-wire analog signal; and
   *wherein said remote terminal receives electrical current from said twisted pair and operates solely from power derived from said twisted pair without a battery or other current source at said remote terminal; and*
   wherein said incoming line-coded digital signal and said outgoing line-coded digital signal are signals selected from the group of 2B1Q and 4B3T signals.

5. The apparatus as recited in claim 1, wherein said outgoing line-coded digital signal and said incoming line-coded digital signal are substantially 80 [ksymbols/second] *kbits/second* signals.

*12. The apparatus of claim 1, wherein said twisted pair has a length greater than 15,000 feet.*

*13. The apparatus of claim 12, wherein said remote terminal and said master equipment maintain line power within power limits prescribed by TR-TSY-000057 standard AII in a standby mode and AIII during active mode.*

\* \* \* \* \*